July 18, 1939.  F. W. SIDE  2,166,378
FLOW METER
Filed Nov. 13, 1937  3 Sheets-Sheet 1
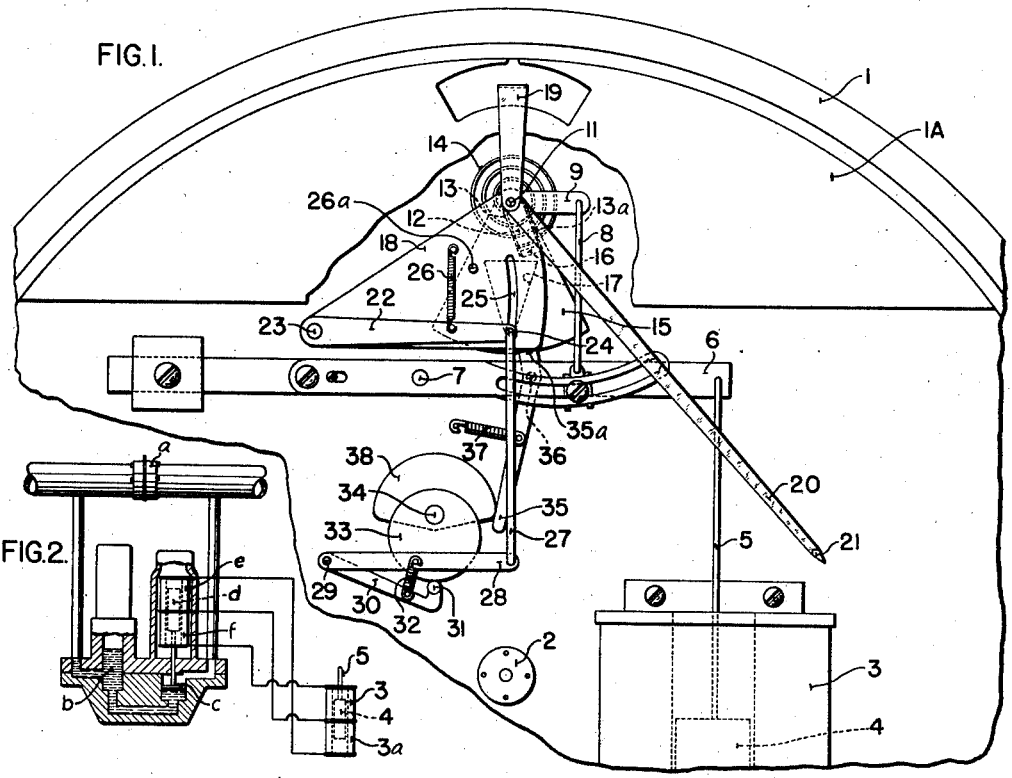
INVENTOR.
FREDERICK W. SIDE
BY George M. Murchang
ATTORNEY

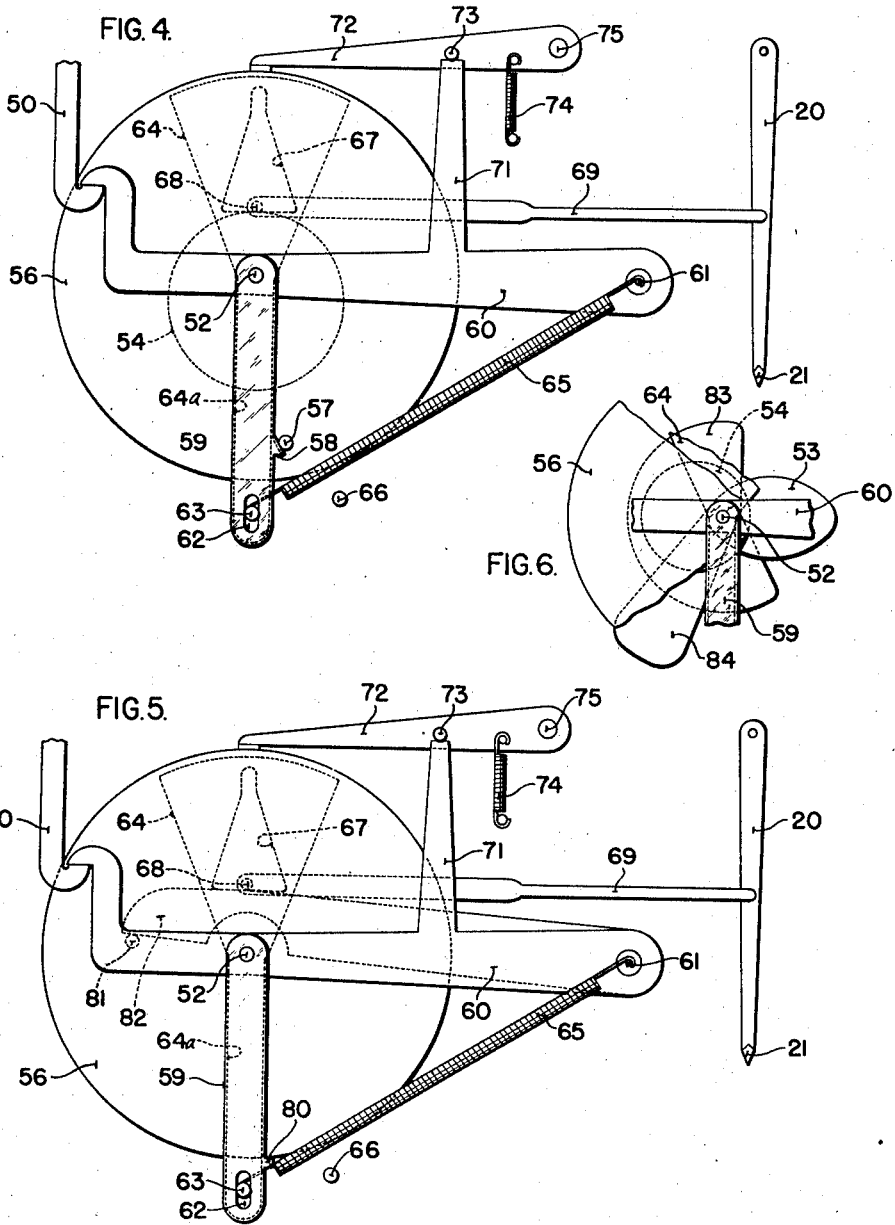

July 18, 1939.  F. W. SIDE  2,166,378
FLOW METER
Filed Nov. 13, 1937  3 Sheets-Sheet 3
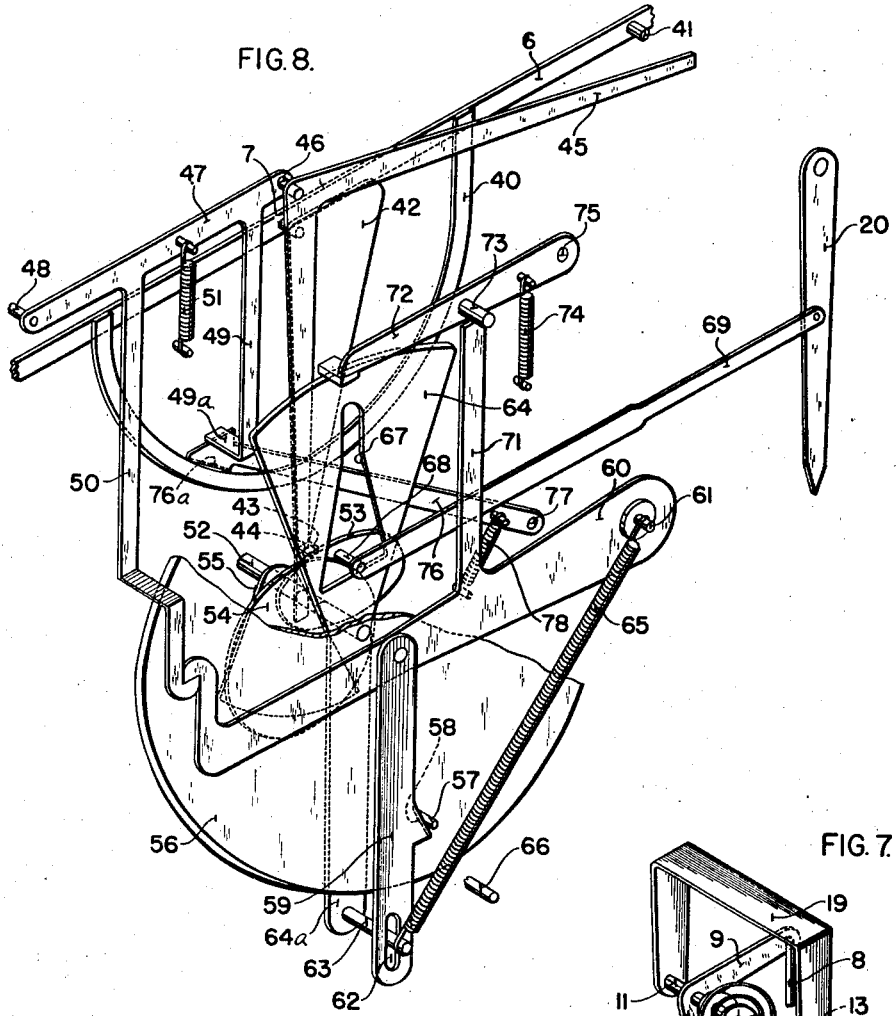
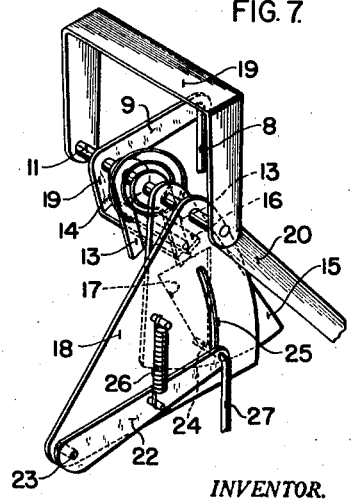
INVENTOR.
FREDERICK W. SIDE
BY George M. Mushomp
ATTORNEY Patented July 18, 1939

2,166,378

UNITED STATES PATENT OFFICE 2,166,378

FLOW METER

Frederick W. Side, Philadelphia, Pa., assignor to The Brown Instrument Company, Philadelphia, Pa., a corporation of Pennsylvania Application November 13, 1937, Serial No. 174,323

18 Claims. (Cl. 74—1)

My present invention relates to instrumentalities useful in the measuring and recording of variable conditions and more particularly to mechanical relay means for effecting adjustments under control of an element deflecting in accordance with a variable condition such as flow.

It is a specific object of my invention to provide a flow meter in which the recording pen is set by an auxiliary power device which is independent of the primary measuring means. In the usual meter of this type the element which is directly responsive to the condition being measured is very sensitive and has only a small amount of power, which is usually not sufficient to accurately move the recording pen across the chart. In this invention, however, since an auxiliary power device is used to set the pen in accordance with the position of primary element, the setting is accurate thruout the entire scale.

It is a further object of my invention to provide an accurate, reliable and simple device to accomplish the above result and one that takes and records these readings without placing an objectionable load upon the primary measuring element, which for the attainment of measuring sensitivity and accuracy must necessarily be free from friction and instrument adjustment loads.

The various features of novelty which characterize my invention are pointed out with particularity in the claims annexed to and forming part of this specification. For a better understanding of the invention, however, and the advantages possessed by it reference should be had to the accompanying drawings and descriptive matter in which I have illustrated a preferred embodiment of the invention, in which, Fig. 1 shows one form of my invention and the manner in which it is mounted in a housing;

Fig. 2 is a diagrammatic showing of the instrument control;

Fig. 3 shows another form of my invention and its actuating mechanism;

Fig. 4 shows the modification of Fig. 3 with various parts omitted for the sake of clearness;

Fig. 5 shows still another form of my invention with certain parts omitted for the sake of clearness;

Fig. 6 shows a different cam arrangement for use in the modifications of Figs. 3 to 5.

Fig. 7 is a perspective view of the embodiment of Fig. 1; and

Fig. 8 is a perspective view of the embodiment of Figs. 3 and 4.

Although equally useful in connection with mechanical and other electrical types of flow metering systems, my invention is here illustrated as adapted for use in the Brown electric flow meter which is now in wide commercial use and which is disclosed in Harrison Patent 1,743,852 granted January 14, 1930. In this system the differential pressure across an orifice $a$ inserted in the pipe line, of a fluid, the rate of flow of which is to be measured, is impressed upon the sealing liquid $b$ of a U-tube manometer, the level of the liquid in either leg of the manometer forming a measure of fluid rate of flow. A float $c$ in the liquid in one manometer leg rising and falling with the sealing liquid level carries an armature $d$ adapted to cooperate with inductance coils $e, f$ forming the transmitting element of a distant reading system. The distant reading system includes receiving coils 3, 3a electrically connected to the transmitting coils $e, f$ and inductively related to a receiver armature 4 which, as more fully described in the previously mentioned patent, is thereby given movements corresponding to the movements imparted to the armature $d$ by the manometer float.

The receiver coils 3, 3a are included in a recorder-instrument of circular form provided with a casing 1 and a chart driving hub which is fixed to a shaft 2 and is rotated at a constant speed by a motor (not shown) making a full revolution in any desired period of time, such as once in twenty-four hours. An upper segment plate 1A cooperates with a lower segment (not shown) to form a closure plate for the front of the instrument casing and to form a bearing plate for a chart which may be mounted on and rotated by the chart hub. The chart hub together with the recorder pens project through the closure plate and the mechanism now to be described is enclosed within the casing and in back of said plate.

The pen arm 20 having pen 21 on its end is to be periodically moved to a position on the chart corresponding to the then position of armature 4 to thereby make a recording of the value of the flow. This is accomplished by the parts and connections therebetween now to be described.

Armature 4 is connected by a link 5 to a lever 6, pivoted on stud 7, and lever 6 is attached by a short link 8 to a lever 9 which is in turn loosely mounted for pivotal movement on shaft 11 and has rigidly fastened to it a lever 12. Also loosely mounted on shaft 11 are two fingers 13, 13a that are biased toward each other by spiral spring 14 whose ends are fastened one to each member 13 and 13a. A plate 15 having formed thereon a projection 16 is free to rotate on shaft 11 and is held in adjusted position with respect to lever 12 by the fingers 13, 13a. These fingers biased toward each other, each contact one side of lever 12 and the projection 16 to resiliently hold them in alignment and cause movement of one by movement of the other. When, however, one of the parts 12 or 15 is held stationary, as will be described later, the spring will give to permit relative movement of the two. The plate 15 has a triangular opening 17 formed in it with the apex pointing downwardly as shown.

A plate 18 is rigidly fastened to shaft 11 which also has fastened thereto yoke 19. This yoke is mounted on shaft 11 in the usual fashion and has one leg extending thru a slot in the segment 1A to which is attached the pen arm 20. Upon movement of the plate 18 the yoke and pen arm are caused to move so that a line will be drawn upon the usual chart (not shown) which is mounted on shaft 2. The plate 18 has an arm 22 pivoted thereon at 23 and has an arcuate slot 25 formed therein thru which is projected a pin 24 on the arm 22. This pin also projects thru opening 17 in plate 15. The arm 22 and its pin 24 are normally held by spring 26 so that the pin 24 is in the upper end of the slot 25 with arm 22 abutting against stop 26a. The arm 22 may be moved so that pin 24 is at the lower end of slot 25 and the apex of opening 17, as shown in the drawings, to position the pen arm, by link 27 pivoted to arm 22 at a point coaxial with pin 24. The other end of the link is connected to lever 28 which is pivoted around a stud 29. Also pivoted on stud 29 is a lever 30 having its outer end turned upwardly and supporting a cam following roller 31. The two levers 28 and 30 are connected together by a short stiff spring 32. The roller 31 bears against the periphery of a cam 33 mounted for rotation with shaft 34 and is held thereagainst by the pull of spring 26 on lever 22, link 27 and lever 28. It is to be noted that spring 32 must be stiffer than spring 26 or when the cam 33 rotates spring 32 would give before spring 26, and lever 22 would not be moved.

The shaft 34 is rotated by the same motor (not shown) that is used to drive shaft 2, but at a much faster rate, as for example, once every six seconds.

A brake lever 35, pivoted at 36, is biased by spring 37 in a clockwise direction so that end 35a of the lever bears against the lower arcuate edge of plate 15. This braking action is periodically removed by cam 38 also mounted on shaft 34 in the proper angular relation to cam 33 to remove the brake at times when member 15 is not subjected to undesirable deflecting forces such, for example, as the camming action of pin 24 against the edge of opening 17.

In the operation of the device commencing with the parts in the position shown in Fig. 1, rotation of cam 38 in a clockwise direction will release the brake from plate 15 and rotation of cam 33 will permit arm 22 and its associated parts to rise under the influence of spring 26, thereby raising pin 24 in the slot 25. Inasmuch as plate 15 is now free from any restraint it will move, under the influence of fingers 13, 13a, to a position corresponding to that of lever 6 and the then value of flow. Continued rotation of cam 38 will cause it to leave lever 35 and spring 37 acting upon the lever will apply the brake to plate 15. This occurs just as the effective portion of cam 33 acts upon roller 31 to bring pin 24 into engagement with the edge of opening 17 in the greatest possible deflective position of plate 15 which may be determined by suitable stops but in the device illustrated is determined by the limits of movement of the armature 4. The cam 33 then forces lever 30, and thru spring 32, lever 28 downwardly moving pin 24 downwardly in slot 25. If the flow has not changed from its value during the preceding cycle the pin 24 will reach the apex of opening 17 without contacting the sides thereof and there will be no movement of the pen arm. If, however, the flow has changed the position of plate 15 will have been altered and on its downward movement pin 24 will bear against one side or the other of the opening 17 and the pin 24 will be cammed toward the apex of the opening, which it reaches at the bottom of the stroke, as shown. The camming force of pin 24 on the side of opening 17 causes plate 18 to move around shaft 11 as an axis, since plate 15 is now held from moving, and thus move the shaft, yoke 19 and pen arm 20 to a position corresponding to that of plate 15 and the then value of flow. The completion of a cycle of operation brings the parts to the relative positions shown in the drawings.

The cam 33 moves roller 31 to a position which, if lever 30 were fastened to lever 28, would tend to bring pin 24 slightly below the bottom of slot 25. When, however, the pin reaches the bottom of the slot spring 32 will give to permit lever 30 to go to the bottom of its stroke without putting an undue strain upon the pin and its associated parts. This feature insures that pin 24 will always move to the bottom of slot 25 and the apex of opening 17. The give of spring 32 also compensates for any slight distance that the bottom of the slot 25 and the apex of opening 17 may move upwardly as they swing around shaft 11 to assume positions on either side of their mid-position. During the time that plate 15 is locked in a fixed position by brake 35 any change in flow will cause movements of parts 4 to 12 and the spring 14 will give to allow relative movement between arm 12 and projection 16. Pen 20 is retained in its adjusted position by the friction in the associated bearings which may be supplemented of course by friction washers or other well known means.

Referring now to the modification of Figures 3 and 4, it will be seen that lever 6 is actuated in a manner similar to the way it was actuated in Fig. 1. The lever in this modification, however, has an arcuate shaped member 40 attached to it and has a projection 41 shown as a screw head extending from one end. Pivoted on shaft 7 beside the lever 6 is an overweighted member 42 that is normally biased by gravity in a clockwise direction and has a projecting edge 43 at its lower end for supporting the edge 44 of bell-crank 45. Bell crank 45 is pivoted at 46 on the end of a lever 47, which is in turn pivoted at 48 and has member 49 with bent in edge 49a and catch 50 extending from its lower side. The whole assembly or latch mechanism is biased in a clockwise direction by spring 51, but is normally prevented from moving in that direction by the edge 43.

A shaft 52, corresponding to shaft 34 of Fig. 1, has mounted on it for rotation therewith three cams 53, 54, and 55 and a disc 56 which has a pin 57 projecting from it that is adapted to contact with a catch 58 consisting of a bent under edge on lever 59. The lever 59 is pivoted for movement about an axis on lever 60; the axis being coaxial with shaft 52. The lever 60 is pivoted at one end for movement around stud shaft 61 fixed in the frame of the device and has on its other end a catch that cooperates with catch 50 for a purpose to be described. The lever 59 has an elongated slot 62 at its lower end thru which projects a pin 63 that is attached to an arm like extension 64a of a member 64 which is pivoted for movement around shaft 52. Both lever 59 and member 64 are biased for counter-clockwise movement by spring 65, the movement being limited by stop 66. The upper end of member 64 is segment shaped and has a generally triangular opening 67 formed therein (Fig. 4) into which projects pin 68 on the end of a link 69 attached at its other end to pen arm 20. An arm 71 extending upwardly from lever 60 normally holds a brake member 72 out of contact with the upper edge of member 64 by contact with pin 73 extending from the side thereof. The brake member is biased in a counter-clockwise direction by spring 74 and is pivoted for movement around 75.

Another brake member 76 is pivoted at 77 and acts thru its upper edge 76a to restrain lever 6 from movement, at times, by means of its contact with arc 40. This brake member is also biased in a counterclockwise direction by a spring 78. Brake 76a is applied when subjected to the displacing force by bell crank 45 as will hereinafter be clear and released at all other times under the action of cam 55.

In the operation of this modification shaft 52 rotating in a clockwise direction causes cam 53 to come into contact with the lower end of member 42 thus turning this member clockwise around shaft 7. As member 42 is caused to rotate it pulls the bell-crank 45 along with it by means of the engagement of parts 43 and 44 until the horizontal arm of the bell-crank reaches pin 41, when the movement of the bell crank is stopped. The lever 6 is at this time held in its adjusted position by contact of brake member 76a with the arcuate segment 40. Continued movement of member 42 under the action of cam 53 causes edge 43 to move out from under edge 44 and permits lever 47 and its connected parts to rotate clockwise about pivot 48 under the influence of spring 51. When cam 53 comes into contact with member 42 pin 57 comes into contact with catch 58 on lever 59 which is at that time abutting pin 66. As cam 53 is moving member 42 the pin 57 is also moving lever 59 and, thru its connecting slot 62 and pin 63, the lever 64, against the action of spring 66. When edge 43 moving out from under edge 44 permits lever 47 to move downwardly, the catch 50 also permits lever 60 to pivot around shaft 61 under its own weight far enough to permit catch 58 to drop below pin 57. On counterclockwise movement of lever 60 arm 71 will be moved downwardly away from pin 73 and the brake 72 will also move around its pivot 75 under the influence of spring 74 to contact the upper arcuate edge of lever 64 to hold that lever and lever 59 in their then positions. It will be seen by this operation that lever 64 is moved from an initial position in which lever 59 is in engagement with stop 66 to a position that is dependent upon the point at which brake 72 is applied to the upper edge of part 64, which will depend in turn upon the position of lever 6 and the then value of the flow being measured.

Continued rotation of the shaft 52 brings cam 54 under pin 68, which extends into opening 67, to lift the pin. As the lifting progresses pin 68, if the then flow value is different from the value of the flow in the previous setting of pin 68, is cammed against one side or the other of opening 67 and is thereby shifted to move link 69 and pen arm 20 until the pin reaches the top of its stroke and is positioned in the apex of the opening. This positively positions the pen in accordance with the value of the flow. As cam 54 rotates pin 68 drops in the opening 67 and cam 55 moves into contact with the lower side of brake arm 76, raising the brake to free arcuate segment 40 and lever 6 to permit the lever to take a new position if the flow has changed since it was previously clamped in position at the beginning of a cycle. Movement of the brake 76 upward will cause it to come into contact with the inturned edge 49a of arm 49 to raise lever 47 and its attached bell-crank 45 so that member 42, which is now permitted to turn clockwise under gravitational bias, can move to bring edge 43 under edge 44 and move lever 60 and its associated lever 59 upwardly so that catch 58 will be in the path of pin 57 at the start of a new cycle. The pen remains in its adjusted position because of a slight friction of its moving parts or by suitable additional friction or braking means.

The modification of Fig. 5 is practically the same as that of Fig. 4, and differs only in the manner in which the levers 59 and 64 are moved and in the manner in which pin 68 is raised in opening 67. The same latch mechanism is used to raise and lower levers 60 and 59 as was used in the modification of Fig. 4. In this modification lever 59 has an inwardly projecting edge 80 that is held in frictional contact with the outer surface of disc 56 by the action of catch 50 on lever 60. As disc 56 rotates the lever 59 and its connected lever 64 are moved, due to the above mentioned frictional contact, from their engagement with pin 66 until edge 43 of the latch mechanism rides out from under edge 44 permitting lever 47 to turn under the bias of spring 51. When this occurs catch 50 will be lowered and lever 60 will move to break the contact between edge 80 and disc 56. Levers 59 and 64 are held in their adjusted positions, as above described, by brake 72 which is applied to the arcuate edge of lever 64 when lever 60 moves downwardly. Upon continued rotation of shaft 52 and disc 56 the pin 81, fastened to the back of the disc, comes under the edge of a lever 82, pivoted at 61, to raise the lever. The upper edge of lever 82 is adapted as it rises to force pin 68 up into the apex of opening 67 to set the pen.

In Fig. 6 there is shown a modified set of cams to be used in connection with the forms of my invention shown in Figures 3 to 5. It is sometimes desirable that the lever 6 be free for a larger portion of the cycle than is possible with the arrangement shown in Fig. 3. In that figure the brake 76 on arc 40 is actuated by cam 55 and is used to lift arm 49 to reset the latch mechanism, which in turn removes brake 72 from the arcuate edge of part 64. This brake cannot be removed from part 64 until cam 54 has forced pin 68 to the top of opening 67 to set the pen. Therefore the effective portion of cam 55 has to follow that of cam 54. This means that lever 6 is free for approximately one-fourth of each cycle.

In Fig. 6 there is shown a cam 83 for releasing brake 76 from arc 40 and another cam 84 for lifting arm 49 to reset the latch mechanism and release the brake from part 64. Cams 53 and 54 are identical to those shown in Fig. 3 and function in the same manner. Assuming that the cams rotate in a clockwise direction, as before, it will be seen that as soon as cam 53 has forced member 42 to the right enough to release the latch at the position this will occur for maximum flow, the cam 83 will come under brake 76 to lift it from arc 40 and thereby free lever 6 from any restraint. Cam 54 will about this time begin to force pin 68 to the top of opening 67 to set the pen. When the pen-setting has taken place cam 84 will come under arm 49, which in this case does not have the bent in portion 49a, to reset the latch mechanism. It will be apparent from looking at cam 83 that the brake 76 will be raised and lever 6 will be free for well over one-half of each cycle.

With respect to the modification of Fig. 5 the pin 81, as has been explained, takes the place of cam 54, but cam 55 has the same relative position with respect to pin 81 that it has with respect to cam 54 in Fig. 4. The use of the two cams 83 and 84 as shown in Fig. 6 with this modification will therefore have the same effect that it did in Fig. 4, namely, cam 83 will lift the brake 76 from arc 40 right after the latch mechanism has been released and cam 84 will lift arm 49 to reset the latch right after the pen setting operation. Thus in this modification also the use of the two cams 83 and 84 will permit the lever 6 to be free for well over one-half of each cycle. It is noted that the longer the lever 6 is free from restraint the more accurate its setting from armature 4 is liable to be. This is particularly true in an instrument in which inertia is relatively high.

The instrument disclosed in this case is a straight recording flow meter and no integrating device has been disclosed. It would, however, not involve invention and would be an obvious expedient if desired to add an integrator of the type shown in Harrison application Serial No. 166,276, filed September 29, 1937 to the recorder herein disclosed.

In each of the modifications that have been described above, a member with a triangular opening is positioned in accordance with the then value of the flow being measured and a pen arm is set by moving a pin on a link connected to the pen arm into an apex of the triangle. Since the pin is thereby definitely positioned in accordance with the position of a member set according to flow, the pen arm is definitely positioned in accordance with the flow.

From the above description of my device it will be apparent that I have provided a mechanism that uses an auxiliary source of power to set the pen, thus relieving the primary element from any load. The device is simple and because of the lack of clearances is accurate to an extreme degree. The relative simplicity of the mechanism permits easy manufacturing of my device and contributes to its long life in practice with a minimum of maintenance.

While in accordance with the provisions of the statutes, I have illustrated and described the best forms of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In a measuring instrument, a plate positioned in accordance with a condition to be measured, said plate having an opening therein, the edges of which converge, a device, a link connected to the device for movement therewith, an element on said link extending into the opening, and means for periodically moving said element to a predetermined position in said opening to thereby position the device.

2. In a measuring instrument, a member positioned in accordance with a condition to be measured, a plate having an opening therein, the edges of which converge, means to move the plate to a position corresponding to that of the member, a link, an element on the link extending into the opening, and means for periodically forcing said element into a predetermined position in said opening to thereby move the link to a position determined by that of said plate.

3. In a measuring instrument, an exhibiting element, a movable link, means connecting said link to said exhibiting element so that movement of said link moves the exhibiting element, a plate having a V-notch therein, an element on said link extending into the V-notch, means for moving said plate in proportion to the condition being measured, and means for forcing the element into the apex of the notch to thereby position the link and exhibiting element in accordance with the position of the plate.

4. In a measuring instrument, a member positioned in accordance with a condition to be measured, a plate having an opening therein, a lever having an element thereon projecting into said opening, said element being normally in one portion of the opening, means for moving the plate to a position corresponding to the position of the member, and means for moving the element to another and definite portion of the opening to thereby position the lever in accordance with the position of the plate.

5. In a flow meter, a member positioned in accordance with a condition to be measured, a plate having an opening therein, the edges of which converge, means connecting said plate for movement with said member, a second plate having an arcuate slot therein, one end of said slot being adapted to be aligned with an apex of the opening, a lever pivoted on said plate and having an element extending thru said slot and thru said opening, means for moving said lever and element to align the said end of the slot and apex of the opening to thereby move the second plate to a position corresponding to the position of the first plate, a device, and means to adjust said device in accordance with movement of the second plate.

6. In a flow meter, a member movable in accordance with a condition to be measured, a plate having a triangular opening therein resiliently connected for movement with said member, a brake for said plate, a link having an element thereon extending into said opening, means for applying the brake to the plate and moving said element to an apex of the opening of said plate while arrested, to thereby position said link in accordance with the position of the plate.

7. In a measuring instrument, a lever having an element thereon, a floating pivot for said lever, an exhibiting element, a connection between said pivot and exhibiting element, a measuring member, a plate having an opening therein, a resilient connection between said member and plate, said element extending into said opening, means for moving said lever until said element contacts an edge of said opening to thereby move the floating pivot and the exhibiting element to a position corresponding to the position of said plate.

8. In a flow meter, a plate having a notch therein, a lever having an element thereon extending into the notch, means positioning said plate in accordance with a condition to be measured, a rotatable cam, means moving said lever in accordance with movement of the cam to bring the element into the apex of the notch, a part, and means connecting said part for movement with said lever.

9. In a flow meter, a member positioned in accordance with a condition to be measured, a rotating shaft, a disc having a pin projecting therefrom rotating with said shaft, a part having an opening therein mounted for rotation around said shaft, means including said pin for positioning said part in accordance with the position of said member, a lever having an element thereon extending into said opening, means for moving said lever util the element contacts a predetermined portion of said opening to thereby position the lever in accordance with the position of said part.

10. In a flow meter, a member positioned in accordance with a condition to be measured, a rotating shaft, a part mounted for rotation on said shaft, a lever, a second lever pivoted on said first lever, the pivot being coaxial with the shaft, the second lever having a projection thereon, a disc mounted on said shaft for rotation therewith having a pin thereon adapted to engage said projection, whereby the second lever will be rotated with the disc, a connection between the part and second lever, a brake for said part, a latch mechanism operated in accordance with the position of said member, means for disengaging the projection and pin and applying the brake when the latch mechanism is operated, an exhibiting element and means for setting the exhibiting element in accordance with the position of the part.

11. In a flow meter, a member positioned in accordance with a condition to be measured, a latch mechanism actuated in accordance with the position of said member, a rotatable part having an opening therein, means for rotating said part to a position controlled by the actuation of the latch mechanism, a link having an element extending thru the opening, and means for moving said element to an edge of said opening to thereby position said link in accordance with the position of the part.

12. In a flow meter, a latch mechanism, a rotatable part having a triangular opening therein, means for rotating said part controlled by the actuation of the latch, means for actuating the latch in accordance with a condition to be measured to thereby position the part in accordance with said condition, a link having an element thereon extending into said opening, an exhibiting element connected to said link and means for moving the element into an apex of the opening to thereby position the exhibiting element.

13. In an instrument, a rotatable disc, a pivoted lever, an arm pivoted on said lever, the pivot point being coaxial with the axis of the disc, a projection on said arm contacting with the periphery of the disc whereby said arm is driven by the disc, a movable part mounted for movement around the axis of the disc, a connection between the part and arm, a member positioned in accordance with a condition to be measured, means for breaking the driving connection between said disc and arm when said arm is positioned in accordance with said member, an exhibiting element, and means to set the exhibiting element in accordance with the position of said part.

14. In a measuring instrument, a member positioned in accordance with a condition to be measured, a plate having a notch therein, a brake for said plate, means for positioning said plate in accordance with the position of said member and thereafter applying said brake to the plate, a device, an element connected for movement with said device and having a projection extending into said notch, means for moving the projection into the apex of the notch to thereby definitely set the element and device relative to the plate.

15. In a flow meter, a latch mechanism, a rotatable part, means for rotating said part controlled by the actuation of said latch, means for actuating said latch in accordance with the value of a condition to be measured to thereby position the part in accordance with the value of said condition, a link, a pin and notch connection between said part and link and means for relatively moving said pin and notch to thereby position the link in accordance with the position of said part.

16. In a measuring instrument, a member positioned in accordance with a condition to be measured, an exhibiting element, a link connected to said element, a pin and notch connection between said member and link, and means for periodically giving said pin and notch relative movements to thereby position said element in accordance with the position of said member.

17. In a measuring instrument, a member moved from an initial position to a position governed by a condition to be measured, a plate moved by said member to a position corresponding thereto, a brake for said plate, an exhibiting element, a link connected to said element, a pin and notch connection between said plate and link, and means for periodically applying said brake to said plate and thereafter giving said pin and notch relative movements to thereby position said element in accordance with the position of said member.

18. In a measuring instrument, a member having an opening therein positioned in accordance with a condition to be measured, an exhibiting element, a link connected to said element, and having a part extending into said opening, and means for periodically giving said part and member relative movements to thereby position said part in said opening and position said element in accordance with the position of said member.

FREDERICK W. SIDE.